US012372030B2

(12) United States Patent
Miller et al.

(10) Patent No.: US 12,372,030 B2
(45) Date of Patent: Jul. 29, 2025

(54) TURBINE ENGINE HAVING A FIRE BOX

(71) Applicant: GENERAL ELECTRIC COMPANY, Schenectady, NY (US)

(72) Inventors: Brandon Wayne Miller, Liberty Township, OH (US); John Carl Glessner, Kings Mills, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/541,303

(22) Filed: Dec. 15, 2023

(65) Prior Publication Data

US 2025/0198345 A1    Jun. 19, 2025

(51) Int. Cl.
*F02C 7/25* (2006.01)
*F01D 25/24* (2006.01)
*F02C 7/32* (2006.01)
*F02K 3/06* (2006.01)

(52) U.S. Cl.
CPC ............... *F02C 7/25* (2013.01); *F01D 25/24* (2013.01); *F02C 7/32* (2013.01); *F02K 3/06* (2013.01); *F05D 2220/36* (2013.01); *F05D 2240/55* (2013.01)

(58) Field of Classification Search
CPC ...... F02C 7/36; F02C 7/28; F02C 7/24; F02C 7/25; F02C 7/32; F01D 25/24; F02K 3/06
See application file for complete search history.

(56) References Cited

U.S. PATENT DOCUMENTS

| | | | |
|---|---|---|---|
| 2,951,395 | A | 9/1960 | Smith et al. |
| 2,978,209 | A | 4/1961 | Kerry |
| 3,543,588 | A | 12/1970 | Richardson |
| 3,638,421 | A | 2/1972 | Chilman |
| 7,090,165 | B2 | 8/2006 | Jones et al. |
| 8,074,455 | B2 | 12/2011 | Pierrot et al. |
| 9,121,351 | B2 | 9/2015 | Ress, Jr. et al. |
| 9,145,834 | B2 | 9/2015 | Frost et al. |
| 9,297,314 | B2 | 3/2016 | Cloft et al. |
| 9,481,474 | B2 | 11/2016 | Casado Montero et al. |
| 9,689,314 | B2 | 6/2017 | Lemarchand et al. |
| 10,689,126 | B2 | 6/2020 | Scannell et al. |
| 10,731,566 | B2 | 8/2020 | Alstad et al. |
| 11,078,848 | B2 | 8/2021 | Peace |
| 11,326,523 | B2 | 5/2022 | Desjardins |
| 11,572,838 | B2 | 2/2023 | Miller et al. |
| 11,591,967 | B2 | 2/2023 | Foutch et al. |
| 11,603,800 | B2 | 3/2023 | Lacko et al. |
| 2004/0065091 | A1 | 4/2004 | Anderson |

(Continued)

FOREIGN PATENT DOCUMENTS

| | | | |
|---|---|---|---|
| FR | 2994585 A1 | 2/2014 | |
| GB | 839961 | 6/1960 | |
| GB | 1277853 A | * 6/1972 | ............... F02C 7/32 |

*Primary Examiner* — Andrew H Nguyen
(74) *Attorney, Agent, or Firm* — McGarry Bair PC

(57) ABSTRACT

A turbine engine having an inner cowl that circumscribes at least a portion of an engine core, where the inner cowl is radially spaced from the engine core. An outer cowl circumscribes at least a portion of the inner cowl where the outer cowl includes a radially outer surface spaced from a radially inner surface to define an outer cowl space. A fire box is located within a portion of the outer cowl space. An accessory device is located in the fire box.

20 Claims, 6 Drawing Sheets

(56) References Cited

U.S. PATENT DOCUMENTS

| | | | |
|---|---|---|---|
| 2004/0238687 A1* | 12/2004 | Jones | F02K 1/64 |
| | | | 244/62 |
| 2005/0045774 A1 | 3/2005 | Hocking | |
| 2006/0101804 A1 | 5/2006 | Stretton | |
| 2006/0248900 A1 | 11/2006 | Suciu et al. | |
| 2009/0188334 A1 | 7/2009 | Merry et al. | |
| 2010/0107650 A1 | 5/2010 | Ress, Jr. et al. | |
| 2011/0154827 A1 | 6/2011 | Ress, Jr. et al. | |
| 2014/0060079 A1* | 3/2014 | Foster | F01D 25/28 |
| | | | 29/893.1 |
| 2014/0090386 A1* | 4/2014 | Cloft | F02C 7/32 |
| | | | 60/801 |
| 2015/0233300 A1 | 8/2015 | Cloft et al. | |
| 2016/0146111 A1 | 5/2016 | Prunera-Usach et al. | |
| 2016/0186598 A1 | 6/2016 | Cloft et al. | |
| 2016/0201565 A1* | 7/2016 | Grose | F02C 7/25 |
| | | | 415/177 |
| 2016/0245183 A1 | 8/2016 | Viel et al. | |
| 2016/0281605 A1 | 9/2016 | Fert et al. | |
| 2017/0122122 A1 | 5/2017 | Lepretre | |
| 2019/0048801 A1 | 2/2019 | Guillemont et al. | |
| 2021/0404386 A1 | 12/2021 | Venter et al. | |
| 2021/0404387 A1 | 12/2021 | Venter et al. | |
| 2022/0397065 A1* | 12/2022 | Smith | F02C 3/22 |
| 2023/0119477 A1 | 4/2023 | Miller et al. | |

* cited by examiner

TURBINE ENGINE HAVING A FIRE BOX

TECHNICAL FIELD

This disclosure relates to a turbine engine, and more specifically, to a turbine engine including a fire box.

BACKGROUND

Gas turbine engines typically include accessory systems and an accessory gearbox to power or drive the accessory systems such as fuel pumps, lubrication pumps, air compressors, scavenge pumps, electrical generators, hydraulic pumps, etc. One or more of the accessory systems, the accessory gearbox, or both can be located in a fire zone.

BRIEF DESCRIPTION OF THE DRAWINGS

A full and enabling disclosure, including the best mode thereof, directed to one of ordinary skill in the art, is set forth in the specification, which refers to the appended figures in which.

In the drawings.

DETAILED DESCRIPTION

Figure 1:
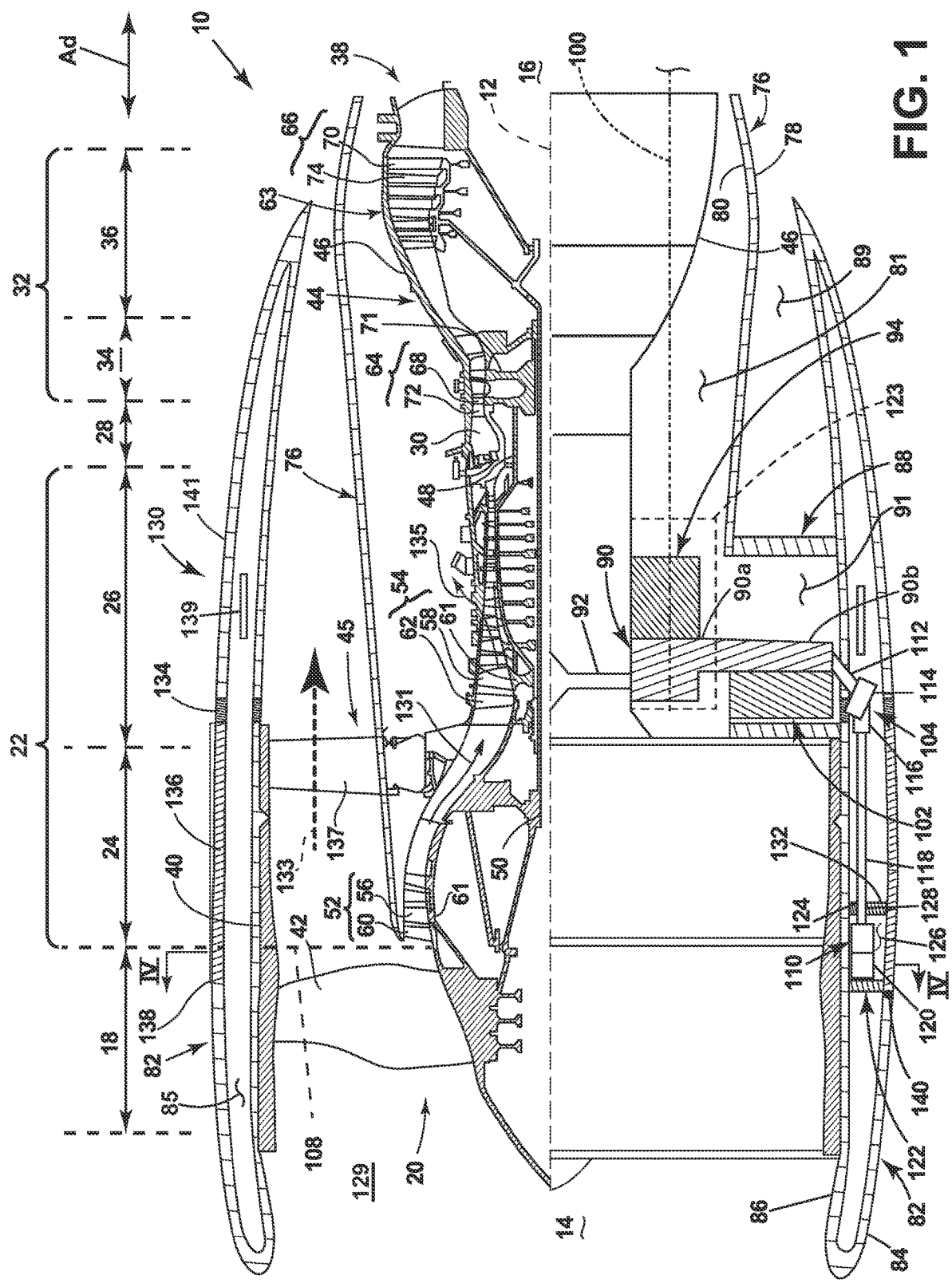
FIG. 1 is a schematic view of a turbine engine with a dual sectional cutaway along a turbine engine axis of rotation illustrating a fire box, according to aspects of the present disclosure.

Traditionally, accessory devices and/or a gearbox that require fire protection are located in an annular chamber defining an annular fire zone. The annular chamber can be in an outer cowl or nacelle.

The added weight of additional walls or surfaces within the outer cowl has traditionally discouraged the use of non-annular fire zones as an increase in weight traditionally results in a decrease of overall turbine engine fuel efficiency.

This disclosure, however, illustrates a solution that improves overall turbine engine fuel efficiency using a fire box that defines a chamber that is a non-annular fire zone. That is, one or more aspects described herein provide a fire box in an outer cowl. The fire box defines a non-annular chamber resulting in a non-annular fire zone. The additional walls needed to define the fire box, when compared to the annular chamber, are offset by at least the weight savings of the amount of fire suppressant.

Further, engine design can decrease the size of the fire box, providing additional weight savings. The current disclosure moves a first accessory and a second accessory out of the outer cowl, requiring only a third accessory device in the fire box. Optionally, a mini accessory gearbox can be located in the fire box with the third accessory device. This configuration results in the need for a smaller fire box as well as a leaner outer cowl which improves the aerodynamics of the outer cowl and the overall turbine engine fuel efficiency increases.

For purposes of illustration, the present disclosure will be described with respect to a turbine engine for an aircraft. More specifically, a ducted turbofan. The ducted turbofan can be direct drive or geared. Further, the disclosure can have applicability in a variety of vehicles or engines, and can be used to provide benefits in industrial, commercial, and residential applications. Further non-limiting examples of other vehicles or engines to which the disclosure can relate can include boats, helicopters, cars, or other aquatic, air, space, or land vehicles. Industrial, commercial, or residential applications of the disclosure can include, but are not limited to, marine power plants, wind turbines, or small power plants.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

Additionally, as used herein, the terms "radial" or "radially" refer to a direction away from a common center. For example, in the overall context of a turbine engine, radial refers to a direction along a ray extending between a center longitudinal axis of the engine (turbine engine axis of rotation) and an outer engine circumference.

Furthermore, as used herein, the term "set" or a "set" of elements can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate structural elements between a collection of elements and relative movement between elements unless otherwise indicated. As such, connection references do not necessarily infer that two elements are directly connected and in fixed relation to one another.

The drawings are for purposes of illustration only and the dimensions, positions, order and relative sizes reflected in the drawings attached hereto can vary.

As used herein, the term "accessory gearbox (AGB)" refers to a gearbox that receives rotational input from a rotating shaft in the engine core of a turbine engine or another gearbox. The AGB provides an output to accessories such as, but not limited to, engine accessories or aircraft accessories. In other words, an AGB provides output to at least one accessory and can optionally provide a rotational output to a second AGB.

A used herein, the term "transfer gear box (TGB)" is a gearbox that provides rotational output to at least another gearbox.

As used herein, the term "aircraft accessory" refers to an accessory that can interface with components outside of the turbine engine, once the turbine engine is self-sustaining. Optionally, aircraft accessory can contribute to the operation of the turbine engine in addition to interfacing with one or more components outside of the turbine engine. Non-limiting examples of aircraft accessories include an electrical generator, a hydraulic pump, an aircraft permanent magnet alternator, or an air turbine starter. Further non-limiting examples can include a primary lubrication pump, secondary lubrication pump, main fuel pump, fuel boost pump, or rotisserie.

As used herein, the term "engine accessory" refers to an accessory that only contributes to the operation of the turbine engine. Non-limiting examples of engine accessories include a fuel pump, main fuel pump, fuel boost pump, lubrication pump, primary lubrication pump, secondary lubrication pump, air compressor, starter, air turbine starter, scavenge pump, fuel control, rotisserie, or permanent magnet alternator.

FIG. 1 is a schematic partial section view of a turbine engine 10 for an aircraft, where an upper section of FIG. 1 illustrates the cross section of the turbine engine 10 and a lower section illustrates a schematic of static support structures, an accessory gearbox, a transfer gearbox, accessory devices, and a connection assembly that couples the accessory gearbox to the transfer gearbox.

The turbine engine 10 has a centerline or turbine engine axis of rotation 12 extending forward 14 to aft 16. The turbine engine 10 includes a fan section 18 including a fan assembly 20, a compressor section 22 including a booster or a low-pressure (LP) compressor 24 and a high-pressure (HP) compressor 26, a combustion section 28 including a combustor 30, a turbine section 32 including an HP turbine 34, and an LP turbine 36, and an exhaust section 38. The fan section 18, the compressor section 22, the combustion section 28, and the turbine section 32, in axial flow arrangement, define the turbine engine axis of rotation 12, where an axial direction (Ad) is defined along the turbine engine axis of rotation 12.

The fan section 18 includes a fan casing 40 surrounding the fan assembly 20. The fan assembly 20 includes a plurality of fan blades 42 disposed radially about the turbine engine axis of rotation 12. The compressor section 22, the combustor 30, and the turbine section 32 form a core illustrated as an engine core 44, which generates combustion gases. The engine core 44 is surrounded by a core casing 46, which can be coupled with the fan casing 40.

An outlet guide vane assembly 45 is located downstream of the fan blades 42. The outlet guide vane assembly 45 can be located in the fan section 18, the LP compressor 24, or axially span a portion of the fan section 18 and a portion of the LP compressor 24.

An HP shaft or HP spool 48 disposed coaxially about the turbine engine axis of rotation 12 of the turbine engine 10 drivingly connects the HP turbine 34 to the HP compressor 26. An LP shaft or LP spool 50, which is disposed coaxially about the turbine engine axis of rotation 12 of the turbine engine 10 within the larger diameter annular HP spool 48, drivingly connects the LP turbine 36 to the LP compressor 24 and fan assembly 20. The HP spool 48 and LP spool 50 are rotatable about the turbine engine axis of rotation 12 and couple to a plurality of rotatable elements, which can collectively define an inner rotor/stator. While illustrated as a rotor, it is contemplated that the inner rotor/stator can be a stator.

The LP compressor 24 and the HP compressor 26 respectively include a plurality of compressor stages 52, 54, in which a set of compressor blades 56, 58 rotate relative to a corresponding set of static compressor vanes 60, 62, which can also be called a nozzle, to compress or pressurize the stream of fluid passing through the stage. In a single compressor stage 52, 54, multiple compressor blades 56, 58 can be provided in a ring and can extend radially outwardly relative to the turbine engine axis of rotation 12, from a blade platform to a blade tip, while the corresponding static compressor vanes 60, 62 are positioned upstream of and adjacent to the rotating compressor blades 56, 58. It is noted that the number of blades, vanes, and compressor stages shown in FIG. 1 were selected for illustrative purposes only, and that other numbers are possible.

The compressor blades 56, 58 for a stage of the compressor can be mounted to a disk 61, which is mounted to the corresponding one of the HP spool 48 and LP spool 50, with each stage having its own disk 61. The vanes 60, 62 for a stage of the compressor section 22 can be mounted to the core casing 46 in a circumferential arrangement.

The HP turbine 34 and the LP turbine 36, respectively, include a plurality of turbine stages 64, 66, in which a set of turbine blades 68, 70 are rotated relative to a corresponding set of static turbine vanes 72, 74, which can also be called a nozzle, to extract energy from the stream of fluid passing through the stage. In a single turbine stage 64, 66, multiple turbine blades 68, 70 can be provided in a ring and can extend radially outwardly relative to the turbine engine axis of rotation 12, from a blade platform to a blade tip, while the corresponding static turbine vanes 72, 74 are positioned upstream of and adjacent to the rotating turbine blades 68, 70. It is noted that the number of blades, vanes, and turbine stages shown in FIG. 1 were selected for illustrative purposes only, and that other numbers are possible.

The turbine blades 68, 70 for a stage of the turbine section 32 can be mounted to a disk 71, which is mounted to the corresponding one of the HP spool 48 and LP spool, 50, with each stage having a dedicated disk 71. The turbine vanes 72, 74 for a stage of the turbine section 32 can be mounted to the core casing 46 in a circumferential arrangement.

Complementary to the rotor portion, the stationary portions of the turbine engine 10, such as the static compressor vanes 60, 62, and the static turbine vanes 72, 74 among the compressor and turbine sections 22, 32 are also referred to individually or collectively as a stator 63. As such, the stator 63 can refer to the combination of non-rotating elements throughout the turbine engine 10.

An inner cowl 76 is radially spaced from the engine core 44 and can circumscribe at least a portion of the engine core 44. The inner cowl 76 can include an outside face 78 and an inside face 80, where the inside face 80 of the inner cowl 76 can confront the engine core 44 or the core casing 46.

An inner cowl space 81 is defined between at least a portion of the engine core 44 and the inner cowl 76. More specifically, the inner cowl space 81 is the region or space between the core casing 46 and the inside face 80 of the inner cowl 76.

A nacelle or outer cowl 82 is radially spaced from the inner cowl 76 and can circumscribe at least a portion of the inner cowl 76. The outer cowl 82 has a radially outer surface 84 and a radially inner surface 86, where the radially inner surface 86 confronts the outside face 78 of the inner cowl 76. The radially outer surface 84 and the radially inner surface 86 define an outer cowl space 85. The outer cowl 82 can support or define the fan casing 40.

A strut or a fairing 88 extends radially from the inner cowl 76 to the outer cowl 82. That is, the fairing 88 radially extends or spans a bifurcated airflow path 89 between the inner cowl 76 and outer cowl 82. The fairing 88 is illustrated, by way of example, as located in the compressor section 22. It is contemplated, however, that a portion of the fairing 88 can extend into the fan section 18 or the combustion section 28. Optionally, the fairing 88 is axially located downstream of the fan casing 40 or the outlet guide vane assembly 45. The fairing 88 connects or couples the inner cowl 76 and the outer cowl 82. More specifically, the fairing 88 can couple the inner cowl space 81 with the outer cowl space 85. In other words, the fairing 88 can include a hollow portion 91 extending between the inner cowl 76 and outer cowl 82.

A first accessory gearbox (AGB1) 90 extends from the inner cowl space 81 into the hollow portion 91 of the fairing 88. That is, the first accessory gearbox (AGB1) 90 includes a first portion 90a located in the inner cowl space 81 and a second portion 90b, extending from the first portion 90a, located in the hollow portion 91 of the fairing 88. Optionally, the AGB1 90 can extend from the inner cowl space 81, through the hollow portion 91 of the fairing 88, and into the outer cowl space 85. The AGB1 90 is axially located upstream of the turbine section 32 and downstream of the fan section 18, the LP compressor 24, or the outlet guide vane assembly 45. One or more rotatable shafts 92 and one or more gears (not shown) can operably couple the AGB1 90 to the HP spool 48 or the LP spool 50.

A first accessory device 94 is coupled to the AGB1 90. The first accessory device 94 is located radially between the core casing 46 and the inner cowl 76. The first accessory device 94 is located upstream of the combustion section 28 or the turbine section 32. Locating both the first accessory device 94 and the AGB1 90 upstream of the combustion section 28 or the turbine section 32 provides temperature benefits.

As illustrated, by way of example, the first accessory device 94 is axially downstream of the AGB1 90. Alternatively, it is contemplated that the first accessory device 94 can be radially offset and axially align with at least a portion of the AGB1 90. In yet another different and non-limiting example, the first accessory device 94 can extend or be located upstream of the AGB1 90.

Alternatively, it is further contemplated in a differing and non-limiting example, that the first accessory device 94 can be a set of first accessory devices that can include aircraft accessories, engine accessories, or a combination therein. The set of first accessory devices are located upstream of the combustion section 28 and can be located downstream, upstream, or at least partially axially align with the AGB1 90. For example, the set of first accessory devices can include two accessory devices where one accessory device is located downstream of the AGB1 90 and the other accessory device is axially aligned with the AGB1 90 or is located circumferentially on either side of the AGB1 90.

The first accessory device 94 is illustrated, by way of example, as an aircraft accessory having communication with an aircraft by a communication line 100. The first accessory device 94 or the set of first accessory devices located within the inner cowl space 81 can be, by way of non-limiting example, one or more of a starter, a hydraulic pump, or an electric generator. The electrical generator can be, by way of non-limiting example, a variable frequency generator. The starter, by way of example, can be a pneumatic starter or air turbine starter. Additionally, it is contemplated that the first accessory device 94 or the set of first accessory devices can include one or more of a lubrication pump, a fuel pump, scavenge pump, fuel metering device, fuel boost pump, permanent magnet alternator, engine turning motor, or rotisserie.

A second accessory device 102 is coupled to the AGB1 90. The second accessory device 102 is located in the hollow portion 91 of the fairing 88. The second accessory device 102 is located upstream of the combustion section 28 or the turbine section 32. Locating both the second accessory device 102 and the AGB1 90 upstream of the combustion section 28 or the turbine section 32 provides temperature benefits.

While illustrated as located in the hollow portion 91 of the fairing, it is contemplated that the second accessory device 102 can be partially located or otherwise extend into the inner cowl space 81.

As illustrated, by way of example, the second accessory device 102 is axially upstream of the AGB1 90. Alternatively, it is contemplated that the second accessory device 102 can extend or be located downstream of the AGB1 90. In yet another different and non-limiting example, the second accessory device 102 can be radially offset and axially align with at least a portion of the AGB1 90.

Alternatively, it is further contemplated in a differing and non-limiting example, that the second accessory device 102 can be a set of second accessory devices that can include aircraft accessories, engine accessories, or a combination therein. The set of second accessory devices are located upstream of the combustion section 28 and can be located downstream, upstream, or at least partially axially align with the AGB1 90. For example, the set of second accessory devices can include two accessory devices where one accessory device is located downstream of the AGB1 90 and the other accessory device is axially aligned with the AGB1 90 or is located circumferentially on either side of the AGB1 90.

The second accessory device 102 or the set of secondary accessory devices can be an aircraft accessory, an engine accessory, or any combination therein. The second accessory device 102 can be by way of non-limiting example, a lubrication pump. Additionally, it is contemplated that the second accessory device 102 or the set of second accessory devices can include one or more of a starter, a hydraulic pump, an electric generator, a fuel pump, scavenge pump, fuel metering device, fuel boost pump, permanent magnet alternator, engine turning motor, or rotisserie.

A connection assembly 104 or a transfer gearbox (TGB) operably couples the AGB1 90 to a second accessory gearbox (AGB2) 110. The connection assembly 104 can include a first transfer shaft 112, a first interface 114, a second interface 116, and a second transfer shaft 118. The first transfer shaft 112 can extend radially from the AGB1 90 toward the outer cowl 82. The first transfer shaft 112 can pass through the hollow portion 91 of the fairing 88. In a different and non-limiting example, the connection assembly 104 that operably couples the AGB1 90 to the AGB2 110 can include a series of interlocking gears (not shown). Further, it is contemplated that any number of shafts, gears, or other elements can couple the AGB1 90 to the AGB2 110 to provide a rotational output from the AGB1 90 received as rotational input at the AGB2 110.

Alternatively, in a different and non-limiting example, the AGB1 90 can extend into the outer cowl space 85 and provide a rotational output to the second transfer shaft 118 to drive the AGB2 110.

The AGB2 110 is coupled to the second transfer shaft 118 and receives rotational energy from the second transfer shaft 118. The AGB2 110 is located upstream of the combustion section 28. However, as illustrated by way of example, the AGB2 110 can be located upstream of the HP compressor section 26. That is, the AGB2 110 can be located in the fan section 18, axially adjacent an upstream portion of the LP compressor 24, or combination thereof.

A third accessory device 120 is illustrated as coupled to the AGB2 110. However, it is contemplated that the third accessory device 120 can be coupled or driven by an electric machine in addition to or instead of coupling to the AGB2 110. It is further contemplated, in a different and non-limiting example, that the third accessory device 120 can be coupled or otherwise driven by the AGB1 90 or the second transfer shaft 118.

The third accessory device 120 is located upstream of the combustion section 28. The third accessory device 120 can also be upstream of the fairing 88 or upstream of at least a portion of the outlet guide vane assembly 45. That is, one or more portions of the third accessory device 120 can be located in the fan section 18, axially overlapping an upstream portion of the LP compressor 24, or combination thereof. By way of non-limiting example, the third accessory device 120 can axially overlap the fan casing 40. Having the AGB2 110 or the third accessory device 120 upstream of the combustion section 28 and radially spaced from the engine core 44 provides a cooler environment than a radially or axially location closer to the combustion section 28.

The third accessory device 120 is located in the outer cowl space 85. As illustrated, by way of example, the third accessory device 120 is axially upstream of the AGB2 110. Alternatively, it is contemplated that the third accessory device 120 can be radially offset and axially align with at least a portion of the AGB2 110. In yet another different and non-limiting example, the third accessory device 120 can extend or be located downstream of the AGB2 110. That is, the third accessory device 120 can extend from any one or more portions of the AGB2 110 in any radial, axial, or circumferential arrangement such that the AGB2 110 provides an output to the third accessory device 120 in the outer cowl 82. It is also contemplated that the third accessory device 120 can axially overlap at least a portion of the fan blades 42.

Alternatively, it is further contemplated in a differing and non-limiting example, that the third accessory device 120 can be a set of third accessory devices (see FIG. 2) that can include aircraft accessories, engine accessories, or a combination therein. The set of third accessory devices 120 are located in the outer cowl space 85 upstream of the HP compressor 26 or the combustion section 28 and can be located downstream, upstream, or at least partially axially align with the AGB2 110.

The third accessory device 120 or the set of third accessory devices can include one or more of a fuel pump, scavenge pump, fuel metering device, fuel boost pump, permanent magnet alternator, engine turning motor, or rotisserie. Additionally, it is contemplated that the third accessory device 120 or the set of third accessory devices can include one or more of a lubrication pump, a starter, a hydraulic pump, or an electric generator.

A fire box 122 is located in a portion of the outer cowl space 85. That is, the fire box 122 encompasses a fractional portion of the available circumferential space defined by the outer cowl space 85. The fire box 122 defines a chamber 126 that can be a fire zone within the outer cowl 82. The third accessory device 120 is located in the chamber 126. That is, the third accessory device 120 or the set of third accessory devices are located within the fire box 122. The chamber 126 is non-annular. That is, the fire box 122 includes a subportion or arced portion of the circumferential outer cowl space 85.

Optionally, the AGB2 110 can be included in the fire box 122. It is also contemplated that the fire box 122 can include any number of accessory devices and/or gearboxes.

A shaft, illustrated as the second transfer shaft 118 can be received by the fire box 122 at an inlet 124. Seals 128 keep the chamber 126 of the fire box 122 isolated from at least the outer cowl space 85 while the second transfer shaft 118 rotates. That is, the second transfer shaft 118 can extend from a region outside the fire box 122, through the inlet 124, to rotatably couple to the AGB2 110, the third accessory device 120, the set of third accessory devices, or any combination thereof. While illustrated at an axially aft surface 132 or axially aft wall, the inlet 124 can be located at surface of the fire box 122. It is contemplated that the fire box 122 can have any number of inlets, where each inlet is provided with one or more seals.

A thrust reverser assembly 130 can be located at least partially within or at the outer cowl 82. Optionally, the thrust reverser assembly 130 can be coupled to the AGB1 90 or the AGB2 110. While illustrated as downstream of the fan casing 40, it is contemplated that the thrust reverser assembly 130 can abut or overlap the fan casing 40.

The thrust reverser assembly 130 can include an actuator 139 and a translating cowl 141. The translating cowl 141 can be one or more portions of the outer cowl 82 that is movable by the actuator 139. The translating cowl 141 can have one or more portions that are pivotable about at least one thrust reverser pivot 134.

At least one door 136 is adapted to be pivotally rotated away from the fan casing 40. The door 136 can include a door hinge 138. A fastener 140 can secure the door 136 to at least one of the outer cowl 82 or another door. Alternatively, the at least one door 136 can be a removable cover.

While illustrated as spaced from the translating cowl 141, it is contemplated that the door 136 overlaps or is included in the translating cowl 141 or the thrust reverser assembly 130.

It is further contemplated that the thrust reverser assembly 130 and the fire box 122 can be located within the outer cowl 82, such that one or more portions of the thrust reverser assembly 130 can define one or more portions of the fire box 122. By way of non-limiting example, the thrust reverser assembly 130 can define at least a portion of the axially aft surface 132 or axially aft wall of the fire box 122.

Optionally, an additional fire box 123 can be provided in the turbine engine 10. The additional fire box 123 can be located, for example, in the inner cowl space 81. Further, it is contemplated in a different and non-limiting example, that the additional fire box 123 can be located partially in the inner cowl space 81, the hollow portion 91 of the fairing 88, or any combination thereof. Any number of fire boxes are contemplated in the turbine engine 10.

In operation, air flows through the fan section 18 to via an inlet 129 that is defined by the fan assembly 20. Airflow exiting the fan section 18 enters a bifurcated airflow path. The bifurcated airflow path includes a first airflow 131 through the engine core 44 and a second airflow 133 through the bifurcated airflow path 89. Therefore, the inlet 129 is fluidly coupled to the engine core 44 and the bifurcated airflow path 89.

The first airflow 131 is channeled into the LP compressor 24 where it is pressurized (hereinafter referred to as "a pressurized airflow 131"), which then supplies the pressurized airflow 131 to the HP compressor 26, which further pressurizes the pressurized airflow 131. The pressurized airflow 131 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the turbine engine 10 via the exhaust section 38. The driving of the LP turbine 36 drives the LP spool 50 to rotate the fan assembly 20 and the LP compressor 24.

A portion of the pressurized airflow 131 can be drawn from the compressor section 22 as bleed air 135. The bleed air 135 can be drawn from the pressurized airflow 131 and provided to engine components requiring cooling. The temperature of pressurized airflow 131 entering the combustor 30 is significantly increased. As such, cooling provided by the bleed air 135 is necessary for operating of such engine components in the heightened temperature environments.

The second airflow 133 travels through the bifurcated airflow path 89 (hereinafter, secondary airflow path 89) defined by the inner cowl 76 and the outer cowl 82. That is, the outside face 78 of the inner cowl 76 and the radially inner surface 86 of the outer cowl 82 can define the secondary airflow path 89.

The second airflow 133 bypasses the engine core 44 and exits the turbine engine 10. The secondary airflow path 89 can include a stationary vane row, and more particularly the outlet guide vane assembly 45, that includes a plurality of airfoil guide vanes 137. More specifically, a circumferential row of radially extending airfoil guide vanes 137 are utilized adjacent the fan section 18 to exert some directional control of the second airflow 133.

Some of the air supplied by the fan assembly 20 can bypass the engine core 44 and be used for cooling of portions, especially hot portions, of the turbine engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

As the LP spool 50 or the HP spool 48 rotate, rotational energy is provided to the AGB1 90 by the one or more rotatable shafts 92. The AGB1 90 provides rotational output to the first accessory device 94, the second accessory device 102, and the connection assembly 104 or the second transfer shaft 118. The connection assembly 104 or the second transfer shaft 118 then rotates one or more portions of the AGB2 110, which is operably coupled to the third accessory device 120. Alternatively, in a different and non-limiting example, the AGB1 90 provides rotational output to the first accessory device 94, the second accessory device 102, and the third accessory device 120. Alternatively, in yet another different and non-limiting example, the AGB1 90 provides rotational output to the first accessory device 94 and the second accessory device 102, and an electric machine provides rotational output to the third accessory device 120.

Figure 2:
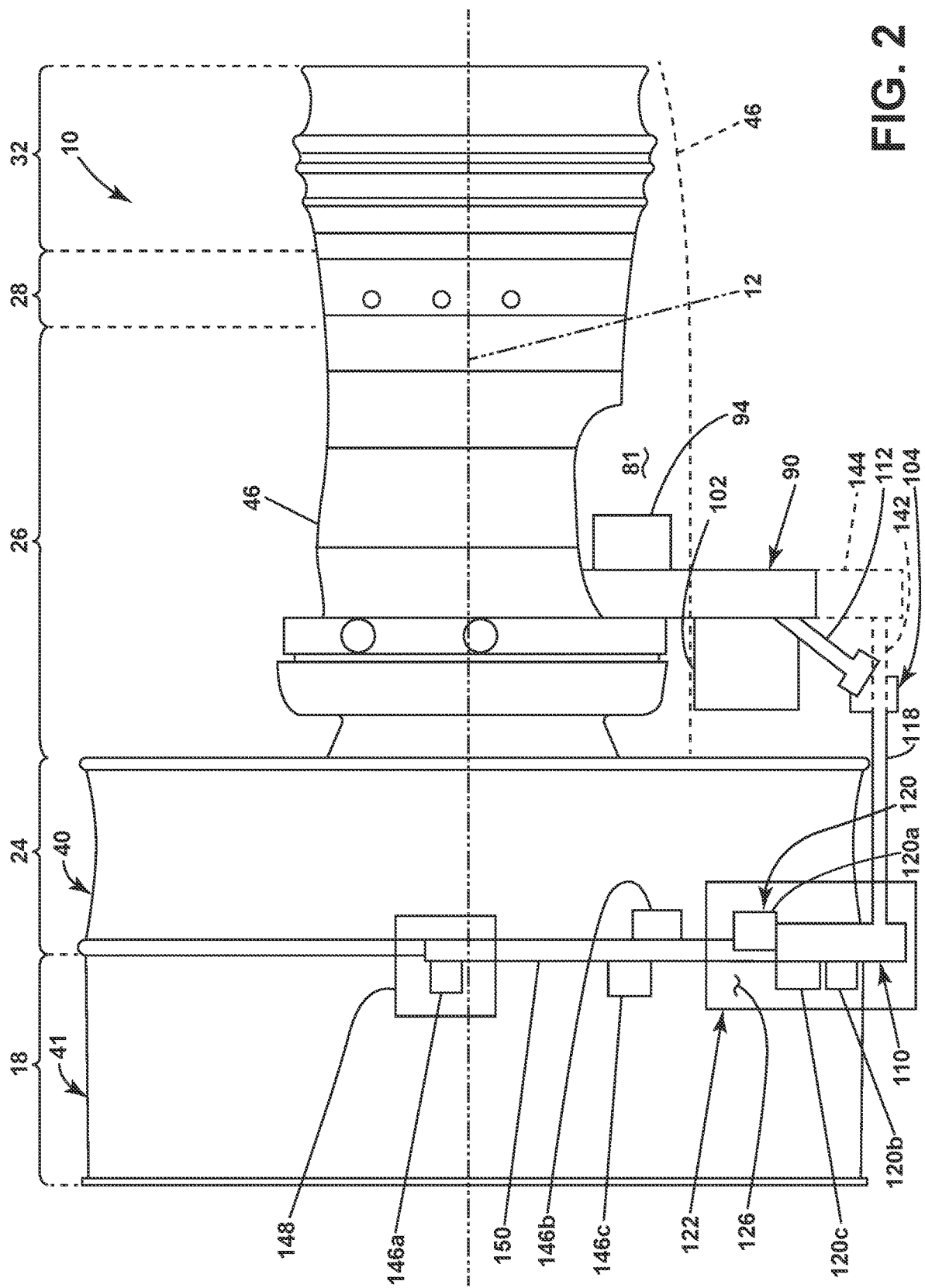
FIG. 2 is a side view of selected components of the turbine engine of FIG. 1, further illustrating the fire box, according to aspects of the present disclosure.

FIG. 2 is a schematic side view of the turbine engine 10 wherein the outer cowl 82, the inner cowl 76, and the fairing 88 (FIG. 1) are removed for ease of understanding.

The third accessory device 120 is illustrated as a set of third accessory devices 120a, 120b, 120c, operably coupled to the AGB2 110. While illustrated as having three accessory devices, the set of third accessory devices 120a, 120b, 120c can include any number of accessory devices.

The set of third accessory devices 120a, 120b, 120c and the AGB2 110 are illustrated, by way of example, as in the chamber 126 of the fire box 122. It is contemplated that any one or more of the set of third accessory devices 120a, 120b, 120c can be included in the fire box 122.

It is contemplated that at least a subset of the set of third accessory devices 120a, 120b, 120c can be mounted to an exterior 41 of the fan casing 40 located at the radially inner surface 86 (FIG. 1) of the outer cowl 82 (FIG. 1). The set of third accessory devices 120a, 120b, 120c can be axially located in one or more of the fan section 18 or the LP compressor 24 (FIG. 1). That is, the set of third accessory devices 120a, 120b, 120c are upstream of the combustion section 28 and the turbine section 32. Further, the set of third accessory devices 120a, 120b, 120c can be upstream of the HP compressor 26.

Connecting accessories, illustrated as connecting accessories 146a, 146b, 146c can be located in the outer cowl space 85 (FIG. 1) on the exterior 41 of the fan casing 40, for example. The connecting accessories 146a, 146b, 146c can couple to one or more of the set of third accessory devices 120a, 120b, 120c. The connecting accessories 146a, 146b, 146c can include, by way of non-limiting example, a fuel filter, a heat exchanger, a monitoring device, or a metering device. While illustrated, by way of example, as outside or exterior of the fire box 122, it is contemplated that one or more of the connecting accessories 146a, 146b, 146c can be included in the fire box 122. It is further contemplated that one or more of the connecting accessories 146a, 146b, 146c are located in a second fire box 148, spaced from the fire box 122. The second fire box 148 can be located in the outer cowl space 85. The second fire box 148 can be coupled to or located adjacent the fan casing 40.

Optionally, a coupling mechanism 150 can provide communication, fluid flow, or transfer of power between the one or more of the connecting accessories 146a, 146b, 146c and one or more of the set of third accessory devices 120a, 120b, 120c.

The first accessory device 94, the second accessory device 102, or both the first accessory device 94 and the second accessory device 102 are larger than at least one device of the set of third accessory devices 120a, 120b, 120c. It is contemplated that a volume of the at least one device of the set of third accessory devices 120a, 120b, 120c is in a range of 2% to 66% of a volume of the first accessory device 94, a volume of the second accessory device 102, or a volume of the first accessory device 94 and a volume of the second accessory device 102. More specially, the at least one device of the set of third accessory devices 120a, 120b, 120c is in a range of 2% to 45% of the volume of the first accessory device 94, the volume of the second accessory device 102, or the volume of the first accessory device 94 and the volume of the second accessory device 102.

It is further contemplated that every device of the set of third accessory devices 120a, 120b, 120c is in a range of 1% to 90% of the volume of the first accessory device 94, the volume of the second accessory device 102, or the volume of the first accessory device 94 and the volume of the second accessory device 102.

The AGB1 90 is larger than the AGB2 110. It is contemplated that a volume of the AGB2 110 is in a range from 10% to 80% of a volume of the AGB1 90. More specifically, the AGB2 110 is in a range from 15% to 66% of the volume of the AGB1 90.

The AGB2 110 is a mini accessory gearbox. As used herein "mini" means that the component referenced with the term mini is smaller than the corresponding like component without the term mini (i.e., the mini accessory gearbox 110 is smaller than the AGB1 90).

The first transfer shaft 112 extending from the AGB1 90 operably couples to the second transfer shaft 118. Optionally, a portion 142 of the second transfer shaft 118 can couple to a portion 144 of the AGB1 90. That is, the AGB1 90 can directly drive the second transfer shaft 118.

While AGB1 90 and AGB2 110 are illustrated as coupled by the first transfer shaft 112, the connection assembly 104, and the second transfer shaft 118, any number of gears or shafts are contemplated to operably couple the AGB2 110 and the AGB1 90. That is, it is contemplated that a series of gears can extend from AGB1 90 to AGB2 to provide AGB2 110 with rotation energy.

Figure 3:
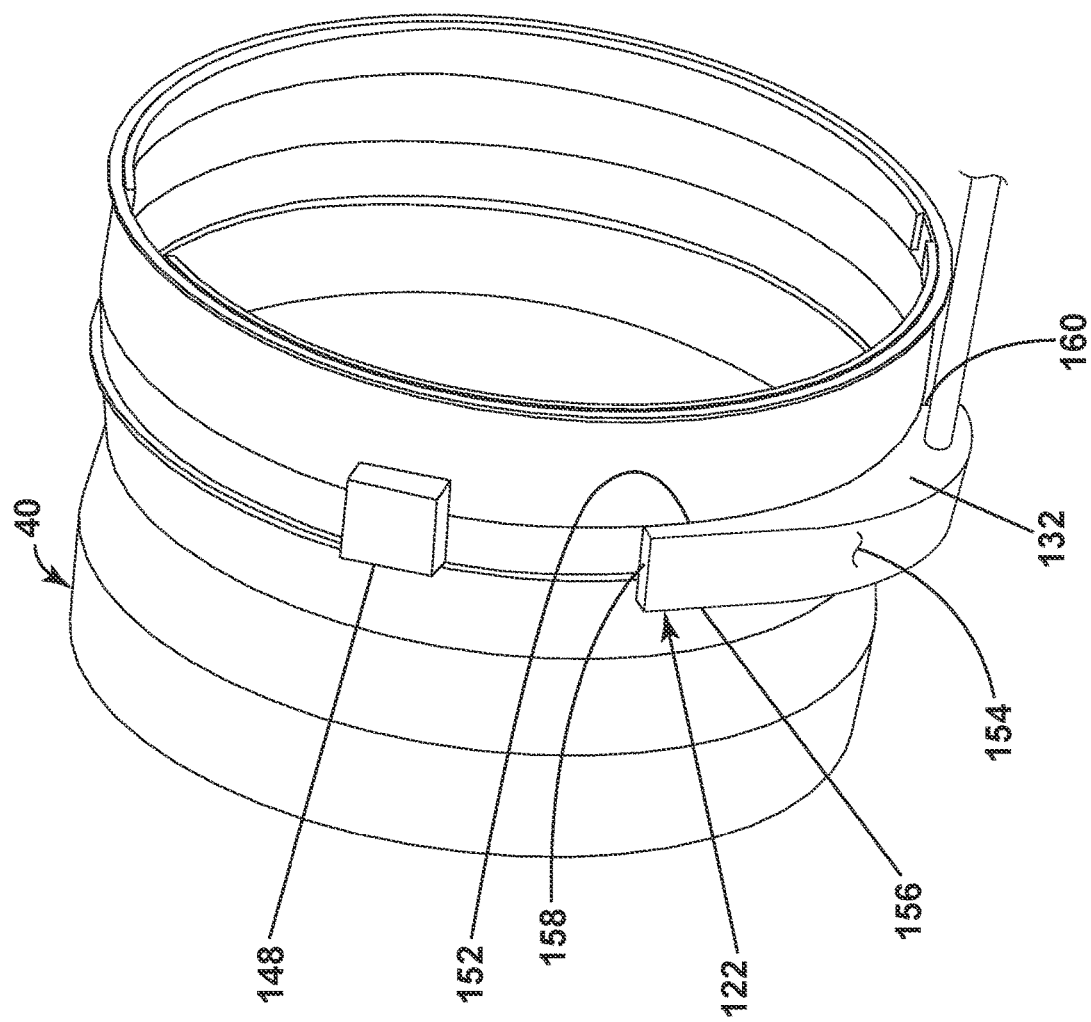
FIG. 3 is a perspective of the selected components of the turbine engine of FIG. 1 further illustrating the fire box, according to aspects of the present disclosure.

FIG. 3 a perspective view further illustrating the fan casing 40, the fire box 122, and the second fire box 148. The fire box 122 can be coupled to or formed by a portion of the fan casing 40. Alternatively, in a different and non-limiting example, the fire box 122 can be coupled to or formed by a portion the radially inner surface 86 (FIG. 1) of the outer cowl 82 (FIG. 1).

The fire box 122 includes a body having, for example, at least six walls or at least six surfaces. The six surfaces include a radially inward surface 152, a radially outward surface 154, an axially forward surface 156, the axially aft surface 132, a first circumferential surface 158, and a second circumferential surface 160. One or more of the at least six surfaces can be unitarily formed with another surface, formed by a component of the turbine engine 10 (FIG. 1), formed on a component of the turbine engine 10, or any combination thereof. That is, the fire box 122 can be a bulkhead structure within the outer cowl space 85 (FIG. 1) or coupled to the fan casing 40.

As illustrated, by way of non-limiting example, the radially outward surface 154, the axially forward surface 156, the axially aft surface 132, the first circumferential surface 158, and the second circumferential surface 160 can be unitarily formed or coupled together. The radially inward surface 152 can be formed by or formed on the fan casing 40.

It is contemplated, in a different and non-limiting example, the axially forward surface 156, the axially aft surface 132, or both can extend from a portion of the fan casing 40 that define the radially inward surface 152.

Alternatively, in a different and non-limiting example, the radially inward surface 152 can be formed by the radially inner surface 86 (FIG. 1) of the outer cowl 82 (FIG. 1). Further, it is contemplated in yet another different and non-limiting example, the radially outward surface 154 of the fire box 122 can be formed by or coupled to the radially outer surface 84 of the outer cowl 82, the door 136 (FIG. 1), the thrust reverser assembly 130 (FIG. 1) or any combination thereof.

While illustrated as having a generally flat or smooth surface, the at least six surfaces can include contours, bends, be defined by multiple pieces or layers of one or more materials, or any combination thereof.

The second fire box 148 is illustrated, by way of example, as circumferentially spaced from the fire box 122. Additionally, it is contemplated that the second fire box 148 can be axially spaced from the fire box 122. Alternatively, the second fire box 148 can abut the fire box 122.

Figure 4:
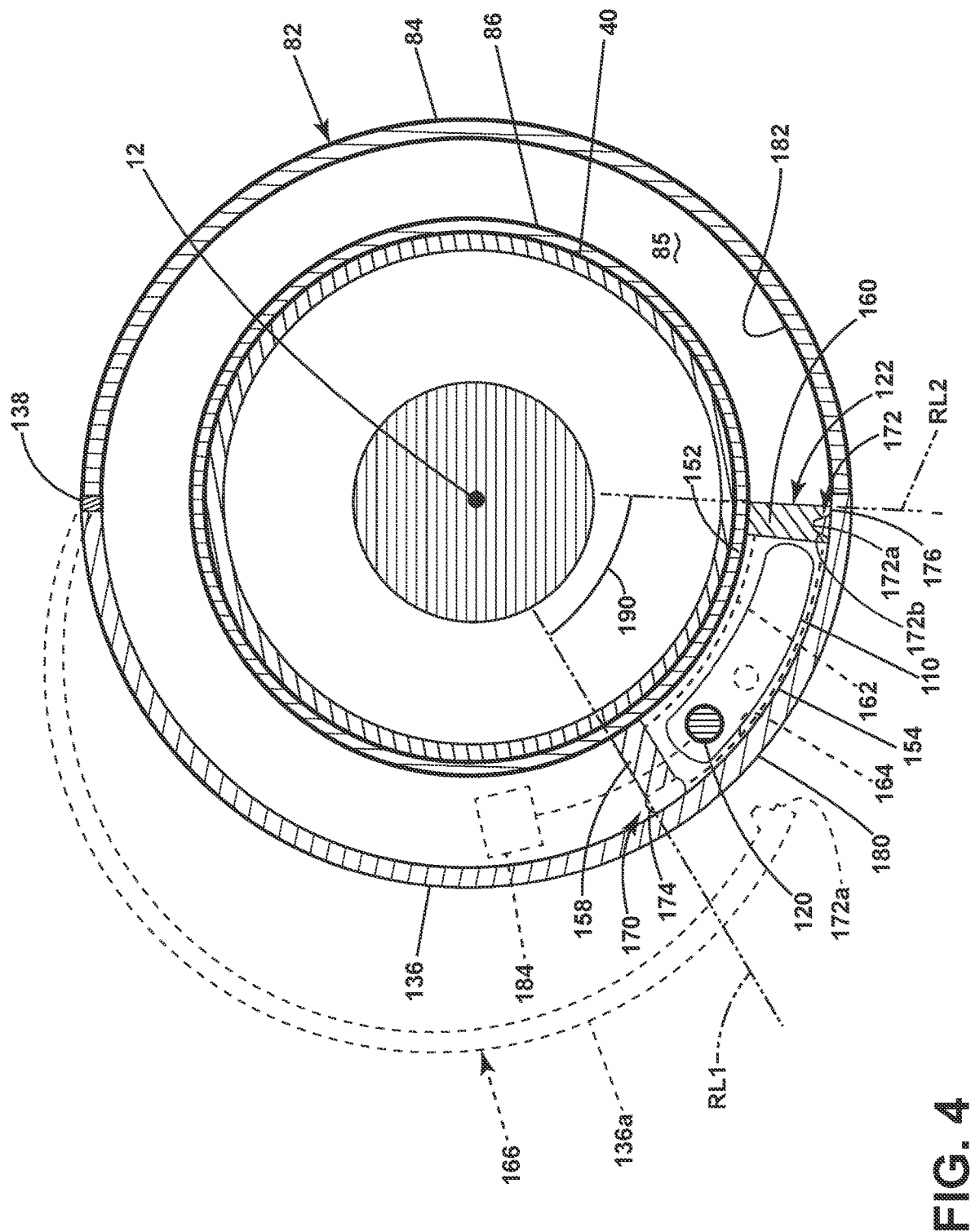
FIG. 4 is a schematic cross-sectional view taken along line IV-IV of FIG. 1, according to aspects of the present disclosure.

FIG. 4 is a schematic cross-section of the turbine engine 10 taken along the line IV-IV of FIG. 1. As illustrated, by way of example, the radially inward surface 152 of the fire box 122 is defined by a portion of the radially inner surface 86 of the outer cowl 82. Optionally, the radially inward surface 152 of the fire box 122 can be defined by a coating 162 on the radially inner surface 86 of the outer cowl 82 or the fan casing 40.

The first circumferential surface 158 and the second circumferential surface 160 extend from the radially inward surface 152. The first circumferential surface 158 and the second circumferential surface 160 can be formed with or coupled to the radially inward surface 152. Optionally, the axially forward surface 156 (FIG. 3) and the axially aft surface 132 (FIG. 3) extend from the radially inward surface 152.

The radially outward surface 154 of the fire box 122 is defined by a portion of radially outer surface 84 of the outer cowl 82. Optionally, the radially outward surface 154 of the fire box 122 can be defined by a coating 164 on the radially outer surface 84 or the door 136.

The door 136 is illustrated as in a closed or secured position. Dotted lines 166 illustrate the door 136a in an open position, where the door 136a is rotated open about the door hinge 138.

A first seal 170 is illustrated, by way of example, as located between first circumferential surface 158 and the radially outward surface 154 of the fire box 122. The first seal 170 is illustrated as a bulb seal, although any seal is contemplated.

A second seal 172 is illustrated, by way of example, as located between the second circumferential surface 160 and the radially outward surface 154 of the fire box 122. The second seal 172, is illustrated as a V-seal having a protruding portion 172a extending from the radially outward surface 154 and a recessed portion 172b in the second circumferential surface 160. As illustrated in the closed position, the protruding portion 172a is received by the recessed portion 172b. When the door 136a is in the open position, as illustrated by the dotted lines 166, the protruding portion 172a is then spaced from the recessed portion 172b.

While illustrated as a bulb seal and a V-seal, the first seal 170 and the second seal 172 can be any type of seal that provides the required isolation of the chamber 126 from the outer cowl 82 and the outer cowl space 85.

The first seal 170, the second seal 172, additional seals, or any combination thereof can extend between one or more portions of the axially forward surface 156 (FIG. 3) and the axially aft surface 132 (FIG. 3) and the radially outward surface 154.

A first radial line RL1 can extend from the turbine engine axis of rotation 12 through one or more portions of the first circumferential surface 158. As illustrated, the first radial line RL1 extends from the turbine engine axis of rotation 12 through a first outside corner 174 at the intersection of the first circumferential surface 158 and the radially outward surface 154.

A second radial line RL2 can extend from the turbine engine axis of rotation 12 through one or more portions of the second circumferential surface 160. As illustrated, the second radial line RL2 extends from the turbine engine axis of rotation 12 through a second outside corner 176 at the intersection of the second circumferential surface 160 and the radially outward surface 154.

An arc length 180 can be measured from the first radial line RL1 to the second radial line RL2. As illustrated, by way of example, the arc length 180 can be measured along the radially outward surface 154 between the first radial line RL1 and the second radial line RL2. In other words, the arc length 180 can be measured along the radially outward surface 154 from the first outside corner 174 to the second outside corner 176. A circumference of the radially outer surface 84 of the outer cowl 82 can be measured about the turbine engine axis of rotation 12 along an inside face 182 of the radially outer surface 84. The inside face 182 can at least partially define the outer cowl space 85. The arc length 180 of the fire box 122 is less than the circumference of the radially outer surface 84 of the outer cowl 82. It is contemplated that the arc length 180 of the fire box 122 is less than or equal to 50% of the circumference of the radially outer surface 84 of the outer cowl 82. For example, the arc length 180 of the fire box 122 can be in a range of 1% to 49% of the circumference of the radially outer surface 84 of the outer cowl 82. By way of an additional non-limiting example, the arc length 180 of the fire box 122 can be in a range of 1% to 40%, 1% to 30%, 2% to 49%, 2% to 40%, 2% to 30%, 2% to 15%, 2% to 10%, 5% to 49%, 5% to 40%, 5% to 30%, 5% to 15%, or 5% to 10% of the circumference of the radially outer surface 84 of the outer cowl 82.

An angle 190 can be measured between the first radial line RL1 and the second radial line RL2. The angle 190 can be less than 360°. For example, the angle 190 can be in a range from 5° to 180°. By way of further non-limiting example, the angle 190 can be in a range from 5° to 90°. By way of yet further non-limiting example, the angle 190 can be in a range from 5° to 35°.

Optionally, an electric machine 184 can be located in the outer cowl space 85 and operably coupled to the third accessory device 120. While illustrated as outside of the fire box 122, it is contemplated in a different and non-limiting example, that the electric machine 184 can be located in the fire box 122, replacing the AGB2 110 or in addition to the AGB2 110.

Figure 5:
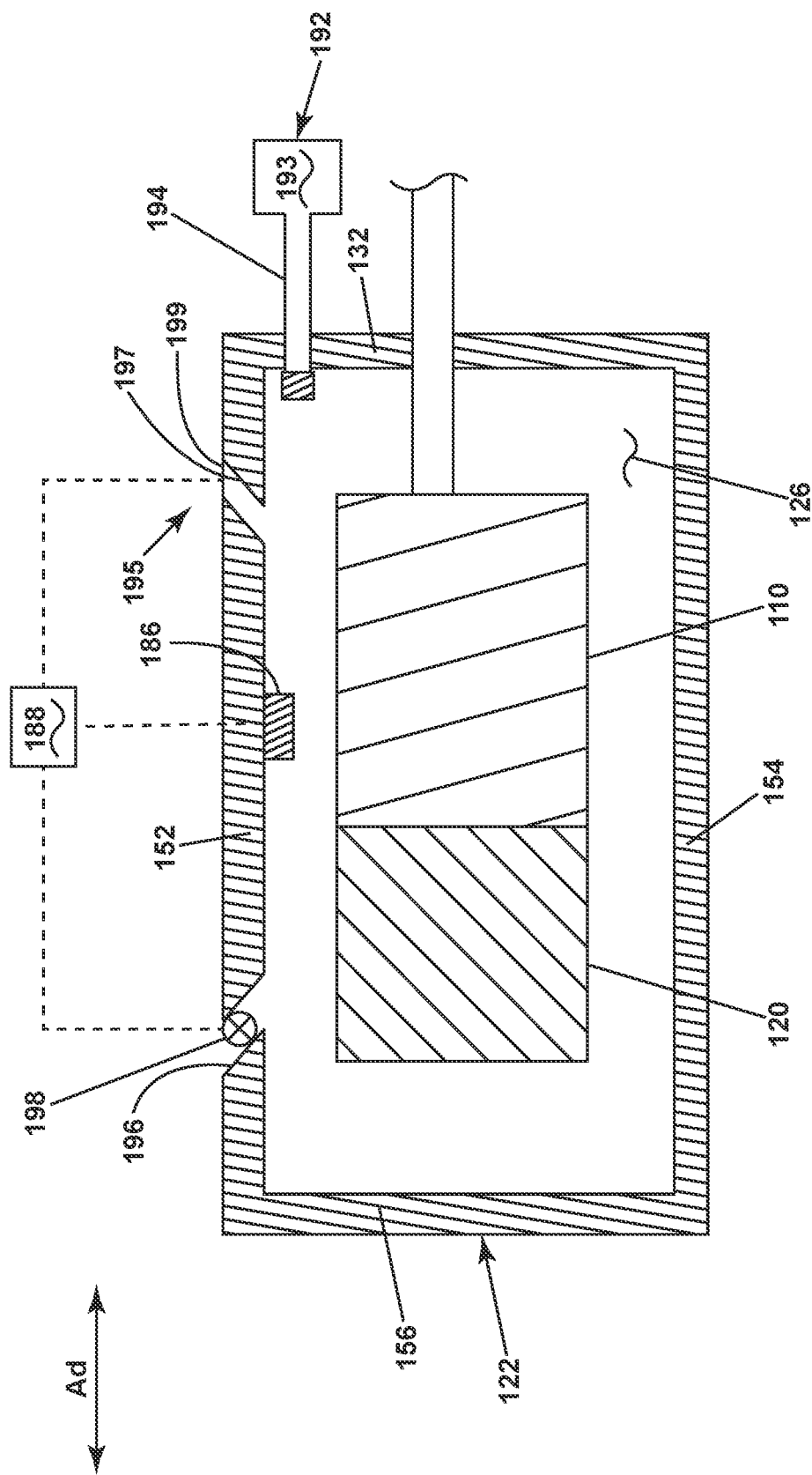
FIG. 5 an enlarged schematic cross section of the fire box of FIG. 1, according to aspects of the present disclosure.

FIG. 5 is an enlarged schematic cross section of the fire box 122 of FIG. 1. The fire box 122 includes the third accessory device 120 and is illustrated, by way of example, as also including the mini accessory gearbox 110. The fire box 122 is illustrated as having the axially forward surface 156 spaced in the axial direction (Ad) from the axially aft surface 132. The radially inward surface 152 and the radially outward surface 154 extend in the axial direction (Ad) between the axially forward surface 156 and the axially aft surface 132. The axially forward surface 156, the axially aft surface 132, the radially inward surface 152, the radially outward surface 154, or any combination thereof can be unitarily formed or coupled together.

Alternatively, it is contemplated that the axially forward surface 156, the axially aft surface 132, the radially inward surface 152, the radially outward surface 154, or any combination thereof can be coupled to or formed by another component of the turbine engine 10 (FIG. 1). By way of non-limiting example, the axially aft surface 132 can be formed by one or more portions of the thrust reverser assembly 130 (FIG. 1).

The chamber 126 defined by the fire box 122 can be a non-annular fire zone. The chamber 126 or fire zone includes a fire detection sensor 186. While illustrated as a single sensor, any number of fire detection devices are contemplated inside the fire box 122 or coupled to one or more portions of the exterior of the fire box 122. The fire detection sensor 186 can be in communication with a controller 188.

A suppressant assembly 192 includes a reservoir 193 containing fire suppressant material and one or more conduits 194 that fluidly couple the reservoir 193 and the chamber 126. Optionally, the suppressant assembly 192 can include any number of valves, pumps, or other components to control the flow of material from the reservoir 193 to the chamber 126.

While illustrated as extending through the axially aft surface 132 of the fire box 122, the one or more conduits 194 can fluidly couple the reservoir 193 and the chamber 126 at any portion of the fire box 122. The fire detection sensor 186 can provide an output to the controller 188. The controller 188 can be in communication with the suppressant assembly 192. Based upon the output provided by the fire detection sensor 186, the controller 188 can communicate with suppressant assembly 192. That is, the output provided by the fire detection sensor 186 determines whether or not the controller 188 activates the suppressant assembly 192 to fluidly couple the reservoir 193 and the chamber 126.

The fire box 122 includes a ventilation system 195 having at least one inlet 196 and at least one outlet 197. When in an open position, air can flow into the chamber 126 through the inlet 196. While illustrated at the radially inward surface 152, the inlet 196 can be located as passing through any portion of the fire box 122, such that an airflow can be provided to the chamber 126. The inlet 196 can include a flow structure 198, such as a valve or flap, that controls the airflow through the inlet 196.

When in an open position, fluid can flow out of the chamber 126 through the outlet 197. While illustrated at the radially inward surface 152, the outlet 197 can be located as passing through any portion of the fire box 122, such that a fluid flow can be exhausted from the chamber 126. The outlet 197 can include a flow structure 199, such as a valve or flap, that controls the flow through the outlet 197.

The airflow into the fire box 122 from the inlet 196 and out of the fire box 122 through the outlet 197 can be passively controlled. For example, the opening and closing of the inlet 196, the outlet 197, or both can be controlled by air speed flowing over one or more portions of the outer cowl 82 (FIG. 1). It can also be passively controlled by one or more sensors, such as, but not limited to, the fire detection sensor 186.

Alternatively, airflow into the fire box from the inlet 196 and out of the fire box through the outlet 197 can be actively controlled by the controller 188.

Figure 6:
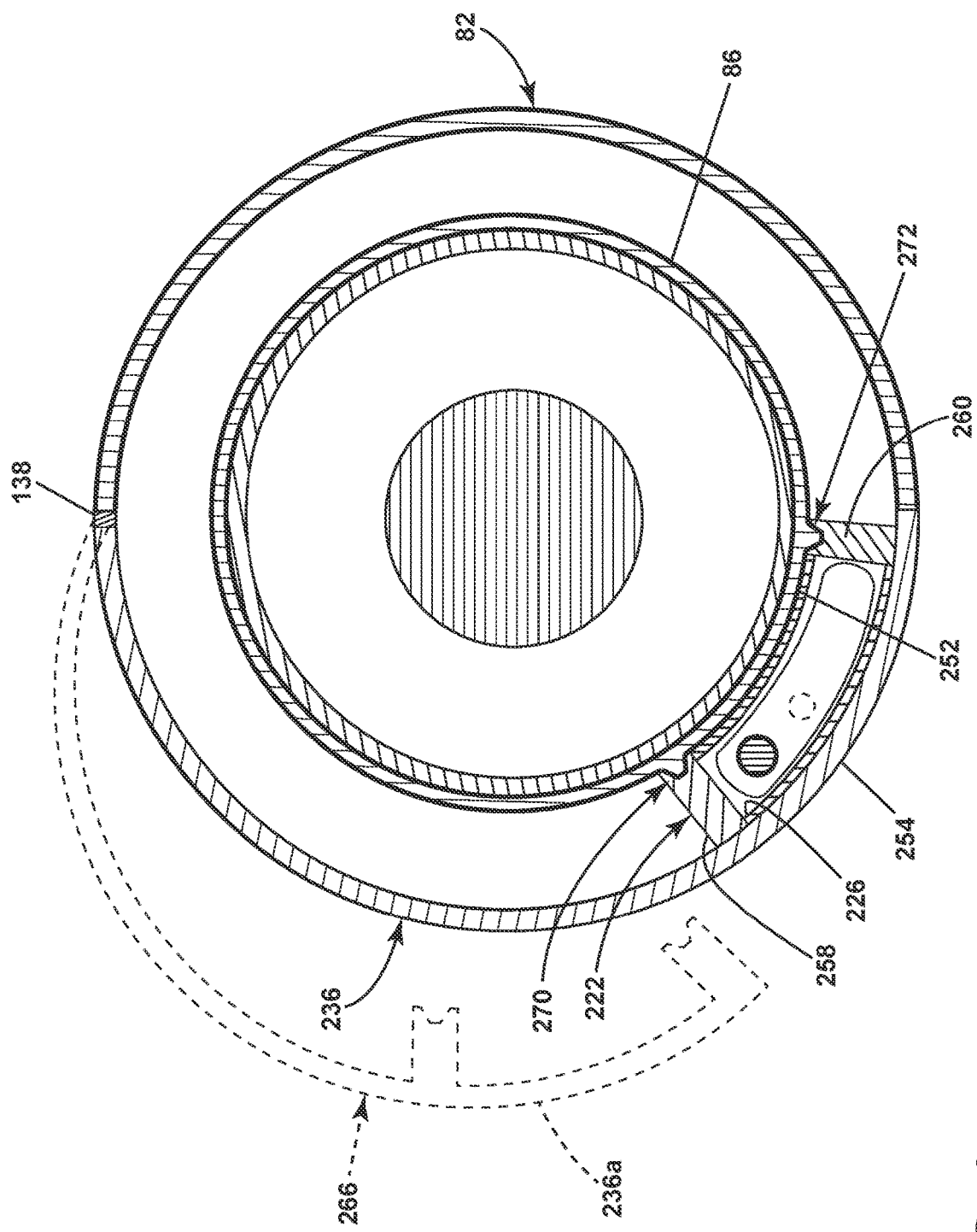
FIG. 6 is a variation of the schematic cross-sectional view of FIG. 4, according to aspects of the present disclosure.

FIG. 6 is a variation of the schematic cross-section of FIG. 4. A fire box 222 defining a chamber 226 is similar to the fire box 122 (FIG. 4) defining the chamber 126, therefore, like parts of the fire box 222 will be identified with like numerals increased by 100, with it being understood that the description of the like parts of the fire box 122 applies to the fire box 222, except where noted.

As illustrated, by way of example, a radially inward surface 252 of the fire box 222 is defined by a portion of the radially inner surface 86 of the outer cowl 82. Alternatively, the radially inward surface 252 of the fire box 222 can be coupled to a portion of the radially inner surface 86 of the outer cowl 82.

The radially outward surface 254 of the fire box 222 is defined by a portion of a door 236. Alternatively, the radially outward surface 254 of the fire box 222 can be coupled to a portion of a door 236.

A first circumferential surface 258 and a second circumferential surface 260 extend from the radially outward surface 254. That is, the first circumferential surface 258 and the second circumferential surface 260 can be coupled to or formed with the door 236. The first circumferential surface 258 or the second circumferential surface 260 can defined by one or more of portions of the turbine engine 10 (FIG. 1). By way of non-limiting example, the first circumferential surface 258, the second circumferential surface 260, or both the first circumferential surface 258 and the second circumferential surface 260 can be defined by portions of the fan casing 40 (FIG. 3), the outer cowl 82, the thrust reverser assembly 130 (FIG. 1), or any combination thereof. It is also contemplated that one or more portions of the first circumferential surface 258, the second circumferential surface 260, or both the first circumferential surface 258 and the second circumferential surface 260 can be defined, at least in part, by a component coupled to one or more of the fan casing 40, the outer cowl 82, the thrust reverser assembly 130 (FIG. 1), or other portion of the turbine engine 10 (FIG. 1).

Optionally, the axially forward surface 156 (FIG. 3) and the axially aft surface 132 (FIG. 3) can extend from the radially outward surface 254 or the door 236.

The door 236 is illustrated as in a closed or secured position. Dotted lines 266 illustrate the door 236a in an open position, where the door 236a is rotated open about the door hinge 138.

A first seal 270 is illustrated, by way of example, as located between first circumferential surface 258 and the radially inward surface 252 of the fire box 222.

A second seal 272 is illustrated, by way of example, as located between the second circumferential surface 260 and the radially inward surface 252 of the fire box 222.

The first seal 270 and the second seal 272 are illustrated, by way of example, as V-seals.

The first seal 270, the second seal 272, additional seals, or any combination thereof can extend between one or more portions of the axially forward surface 156 (FIG. 3) and the axially aft surface 132 (FIG. 3) and the radially inward surface 252 of the fire box 222.

Benefits of aspects of the disclosure include improved overall fuel efficiency. This is achieved by the smaller, non-annular fire zone. The fire box, as described, requires less fireproof or fire-resistant material than an annular fire box. Fireproof or fire-resistant construction typically requires the use of heavier material capable of handling higher temperatures and/or added insulation. Therefore, the fire box, as described, being non-annular can require less fireproof or fire-resistant material and/or less insulation than the annular fire zone.

Additionally, the smaller volume of the fire zone, as described herein, decreases the amount of fire suppressant material needed, resulting in less material carried in the reservoir. This results in a smaller reservoir and less fire suppressant material which is an additional weight savings.

The weight savings from reducing the amount of fireproof or fire-resistant material and/or insulation as well as the decrease in the amount of fire suppressant material and reservoir size offset the additional structure or walls to form the fire box in the outer cowl space.

Overall fuel efficiency is further improved by the unique design that reflects a desirable trade between the benefit of overall fuel efficiency verses the penalties of electing to use two gearboxes, wherein one of the gearboxes is in the fire box. That is, using two gearboxes, where the primary gearbox is located in the inner cowl space and the hollow portion of the fairing and the mini gearbox is located in the outer cowl space, along with placing larger accessories in the inner cowl space or the hollow portion of the fairing with smaller accessories located in the outer cowl provides the unexpected solution of improved overall fuel efficiency. The smaller accessories and/or the mini accessory gearbox further reduce the size of the fire box, further reducing the amount of fire suppressant material required and size of reservoir.

Benefits of locating the first accessory device (or the set of first accessory devices) and the second accessory device within the inner cowl space and fairing (instead of in the outer cowl space) improves aerodynamics and weight of the outer cowl and the inner cowl. A thinner, lighter outer cowl can be used and therefore provides a weight savings. Further, the aerodynamics of the outer cowl and/or the inner cowl can be improved. That is, the inner and outer cowls can be smaller and/or more streamlined or aerodynamic when the first accessory device (or the set of first accessory devices) and the second accessory device are within the inner cowl and fairing instead of in the outer cowl. The improved airflow through the cowls and improved aerodynamic lines improves fuel efficiency.

Additional benefits are provided by having the option of locating components in one or more of the outer cowl, inner cowl, core, or fairing in the bifurcation. This allows for optimizing maintenance access for each component as well as improved packaging with a greater number of choices for the location of each component.

Further aspects of the disclosure are provided by the subject matter of the following clauses:

A turbine engine comprising a fan section, a compressor section, a combustion section, and a turbine section in axial flow arrangement and defining a turbine engine axis of rotation, an engine core defined by the compressor section, the combustion section, and the turbine section, an inner cowl circumscribing at least a portion of the engine core, an outer cowl circumscribing at least a portion of the inner cowl, the outer cowl having a radially inner surface spaced from a radially outer surface, wherein an outer cowl space is at least partially defined between the radially inner surface and the radially outer surface, a fire box located within a portion of the outer cowl space, the fire box having an arc length less than a circumference of the radially outer surface of the outer cowl, and an accessory device located in the fire box.

A turbine engine comprising a fan section, a compressor section, a combustion section, and a turbine section in axial flow arrangement and defining a turbine engine axis of rotation, an engine core defined by the compressor section, the combustion section, and the turbine section, an inner cowl circumscribing at least a portion of the engine core, an outer cowl circumscribing at least a portion of the inner cowl, the outer cowl having a radially inner surface spaced from a radially outer surface, wherein an outer cowl space is at least partially defined between the radially inner surface and the radially outer surface, a fire box located within a portion of the outer cowl space, the fire box having an arc length less than a circumference of the radially outer surface of the outer cowl, an accessory device located in the fire box, a first accessory gearbox located in the fire box and operably coupled to the accessory device, and a second accessory gearbox, wherein a portion of the second accessory gearbox is located in an inner cowl space.

The turbine engine of any preceding clause, wherein the arc length of the fire box is less than or equal to 50% of the circumference of the radially outer surface of the outer cowl.

The turbine engine of any preceding clause, wherein the arc length of the fire box is in a range of 5% to 40% of the circumference of the radially outer surface of the outer cowl.

The turbine engine of any preceding clause, wherein the fire box includes at least six surfaces that include a radially inward surface, a radially outward surface, an axially forward surface, an axially aft surface, a first circumferential surface, and a second circumferential surface.

The turbine engine of any preceding clause, wherein the first circumferential surface or the second circumferential surface can be defined by portions of a fan casing, the outer cowl, a thrust reverser assembly, or any combination thereof.

The turbine engine of any preceding clause, wherein the radially inward surface is a portion of the radially inner surface of the outer cowl.

The turbine engine of any preceding clause, wherein the radially outward surface is coupled to or defined by a portion of the radially outer surface of the outer cowl.

The turbine engine of any preceding clause, wherein the radially outward surface is a portion of a door.

The turbine engine of any preceding clause, wherein at a portion of the axially forward surface, the axially aft surface, or the axially forward surface and the axially aft surface is coupled to the door or a translating cowl.

The turbine engine of any preceding clause, further comprising seals located between the first circumferential surface and at least one of the radially inward surface or the radially outward surface of the fire box, between the second circumferential surface and at least one of the radially inward surface or the radially outward surface of the fire box, or between both the first circumferential surface and the second circumferential surface and at least one of the radially inward surface or the radially outward surface of the fire box.

The turbine engine of any preceding clause, wherein the axially forward surface and the axially aft surface extend from a fan casing.

The turbine engine of any preceding clause, further comprising an accessory gearbox located in the fire box and operably coupled to the accessory device.

The turbine engine of any preceding clause, further comprising an electric machine located in the outer cowl and operably coupled to the accessory device.

The turbine engine of any preceding clause, wherein the accessory gearbox located in the fire box is a first accessory gearbox and the turbine engine further comprises a second accessory gearbox, wherein a portion of the second accessory gearbox is located in an inner cowl space.

The turbine engine of any preceding clause, further comprising a fairing extending radially between the inner cowl and the outer cowl having at least a hollow portion.

The turbine engine of any preceding clause, wherein the second accessory gearbox includes a first portion located in the inner cowl space and a second portion, extending from the first portion, located in the hollow portion of the fairing.

The turbine engine of any preceding clause, wherein a second accessory device is located in the hollow portion of a fairing extending radially between the inner cowl and the outer cowl and operably coupled to the second portion of the second accessory gearbox.

The turbine engine of any preceding clause, further comprising a connection assembly between the first accessory gearbox and the second accessory gearbox that includes at least two rotatable shafts and at least one interface transferring rotation from one shaft to the other shaft.

The turbine engine of any preceding clause, wherein a shaft of the at least two rotatable shafts extends axially within the outer cowl space.

The turbine engine of any preceding clause, wherein the accessory device is a first accessory device and the turbine engine further comprises a second accessory device located in a hollow portion of a fairing extending radially between the inner cowl and the outer cowl.

The turbine engine of any preceding clause, wherein the fire box defines a fire zone having a fire detection sensor.

The turbine engine of any preceding clause, wherein the fire detection sensor provides an output to a controller that is in communication with a suppressant assembly.

The turbine engine of any preceding clause, wherein the suppressant assembly includes a reservoir containing fire suppressant material and one or more conduits that fluidly couple the reservoir and the chamber.

The turbine engine of any preceding clause, wherein the fire box includes a ventilation system having at least one inlet and one outlet.

The turbine engine of any preceding clause, wherein an airflow into the fire box from the inlet and out of the fire box through the outlet is passively controlled.

The turbine engine of any preceding clause, wherein an airflow into the fire box from the inlet and out of the fire box through the outlet is actively controlled by the controller.

What is claimed is:

1. A turbine engine comprising:
   a fan section, a compressor section, a combustion section, and a turbine section in axial flow arrangement and defining a turbine engine axis of rotation;
   an engine core defined by the compressor section, the combustion section, and the turbine section;
   an inner cowl circumscribing at least a portion of the engine core, wherein an inner cowl space is defined between the at least a portion of the engine core and the inner cowl;
   an outer cowl circumscribing at least a portion of the inner cowl, the outer cowl having a radially inner surface spaced from a radially outer surface, wherein an outer cowl space is at least partially defined between the radially inner surface and the radially outer surface;
   a fairing extending radially between the inner cowl and the outer cowl, the fairing having at least a hollow portion;
   an accessory gearbox having a first portion of the accessory gearbox located in the inner cowl space and a second portion of the accessory gearbox, extending from the first portion of the accessory gearbox, located in the hollow portion of the fairing;
   a fire box located within a portion of the outer cowl space, the fire box having an arc length less than a circumference of the radially outer surface of the outer cowl; and
   an accessory device located in the fire box.

2. The turbine engine of claim 1, wherein the arc length of the fire box is less than or equal to 50% of the circumference of the radially outer surface of the outer cowl.

3. The turbine engine of claim 1, wherein the arc length of the fire box is in a range of 5% to 40% of the circumference of the radially outer surface of the outer cowl.

4. The turbine engine of claim 1, wherein the fire box includes at least six surfaces that include a radially inward surface, a radially outward surface, an axially forward surface, an axially aft surface, a first circumferential surface, and a second circumferential surface.

5. The turbine engine of claim 4, wherein the radially inward surface is a portion of the radially inner surface of the outer cowl.

6. The turbine engine of claim 4, wherein the radially outward surface is a portion of a door.

7. The turbine engine of claim 6, wherein a portion of the axially forward surface, the axially aft surface, or the axially forward surface and the axially aft surface is coupled to the door or a translating cowl.

8. The turbine engine of claim 7, further comprising seals located between the first circumferential surface and at least one of the radially inward surface or the radially outward surface of the fire box, between the second circumferential surface and at least one of the radially inward surface or the radially outward surface of the fire box, or between both the first circumferential surface and the second circumferential surface and at least one of the radially inward surface or the radially outward surface of the fire box.

9. The turbine engine of claim 4, wherein the axially forward surface and the axially aft surface extend from a fan casing.

10. The turbine engine of claim 1, wherein the accessory device located in the fire box is a first accessory device and the turbine engine further comprises a second accessory device located in the hollow portion of the fairing and operably coupled to the second portion of the accessory gearbox.

11. The turbine engine of claim 1, wherein the fire box defines a fire zone having a fire detection sensor.

12. The turbine engine of claim 11, wherein the fire detection sensor provides an output to a controller that is in communication with a suppressant assembly.

13. The turbine engine of claim 12, wherein the fire box includes a ventilation system having at least one inlet and one outlet.

14. A turbine engine comprising:
a fan section, a compressor section, a combustion section, and a turbine section in axial flow arrangement and defining a turbine engine axis of rotation;
an engine core defined by the compressor section, the combustion section, and the turbine section;
an inner cowl circumscribing at least a portion of the engine core, wherein an inner cowl space is defined between the at least a portion of the engine core and the inner cowl;
an outer cowl circumscribing at least a portion of the inner cowl, the outer cowl having a radially inner surface spaced from a radially outer surface, wherein an outer cowl space is at least partially defined between the radially inner surface and the radially outer surface;
a fairing extending radially between the inner cowl and the outer cowl, the fairing having at least a hollow portion;
an accessory gearbox having a first portion of the accessory gearbox located in the inner cowl space and a second portion of the accessory gearbox, extending from the first portion of the accessory gearbox, located in the hollow portion of the fairing;
a first access accessory device located at the inner cowl and operably coupled to the first portion of the accessory gearbox;
a second access accessory device located at the hollow portion of the fairing and operably coupled to the second portion of the accessory gearbox;
a fire box located within a portion of the outer cowl space, the fire box having an arc length less than a circumference of the radially outer surface of the outer cowl; and
a third accessory device located in the fire box.

15. The turbine engine of claim 14, wherein the fire box defines a fire zone having a fire detection sensor, and wherein the fire detection sensor provides an output to a controller that is in communication with a suppressant assembly.

16. A turbine engine comprising:
a fan section, a compressor section, a combustion section, and a turbine section in axial flow arrangement and defining a turbine engine axis of rotation;
an engine core defined by the compressor section, the combustion section, and the turbine section;
an inner cowl circumscribing at least a portion of the engine core, wherein an inner cowl space is defined between the at least a portion of the engine core and the inner cowl;
an outer cowl circumscribing at least a portion of the inner cowl, the outer cowl having a radially inner surface spaced from a radially outer surface, wherein an outer cowl space is at least partially defined between the radially inner surface and the radially outer surface;
a fairing extending radially between the inner cowl and the outer cowl, the fairing having at least a hollow portion;
a first accessory gearbox having a first portion of the first accessory gearbox located in the inner cowl space and a second portion of the first accessory gearbox, extending from the first portion of the first accessory gearbox, located in the hollow portion of the fairing;
a fire box located within a portion of the outer cowl space, the fire box having an arc length less than a circumference of the radially outer surface of the outer cowl;
a second accessory gearbox located in the fire box; and
an accessory device located in the fire box.

17. The turbine engine of claim 16, wherein the fire box includes a ventilation system having at least one inlet and one outlet.

18. The turbine engine of claim 16, wherein the arc length of the fire box is less than or equal to 50% of the circumference of the radially outer surface of the outer cowl.

19. The turbine engine of claim 16, further comprising a connection assembly between the first accessory gearbox and the second accessory gearbox that includes at least two rotatable shafts and at least one interface transferring rotation from one shaft of the at least two rotatable shafts to the other shaft of the at least two rotatable shafts.

20. The turbine engine of claim 19, wherein the one shaft of the at least two rotatable shafts extends axially within the outer cowl space.

* * * * *